May 30, 1961     F. HERRMANN     2,986,433

MIST LUBRICATION SYSTEM FOR HIGH SPEED ROTATING MACHINERY

Filed June 27, 1958

INVENTOR.
FRED HERRMANN
BY Robert W. Ely
ATTORNEY

United States Patent Office 2,986,433
Patented May 30, 1961

2,986,433
MIST LUBRICATION SYSTEM FOR HIGH SPEED ROTATING MACHINERY
Fred Herrmann, West Englewood, N.J., assignor to The Bendix Corporation, a corporation of Delaware
Filed June 27, 1958, Ser. No. 745,116
6 Claims. (Cl. 308—187)

This invention relates to the lubrication of the bearings of high speed rotating machinery and more particularly concerns means for providing oil-mist lubrication and cooling.

An object of the present invention is to provide an improved oil-mist lubrication and cooling system for the bearings of a high speed air turbine drive. A further object is the provision of such a lubrication system which forms an oil mist adjacent the bearings and impinges the mist on the bearings for maximum heat transfer. An additional object is to provide a compact oil-mist sprayer or applicator which does not require external oil lines and is adapted for easy assembly in relation to two spaced bearings. A further object is the provision of an oil-mist lubrication system for an air turbine which uses turbine air and separates oil from the air and returns the by gravity to the sump of an aspirating sprayer. Another object is the provision of an oil mist lubricator which has gravity oil return but which can operate for a sustained period of time in inverted position as required in aircraft.

Figure 1:
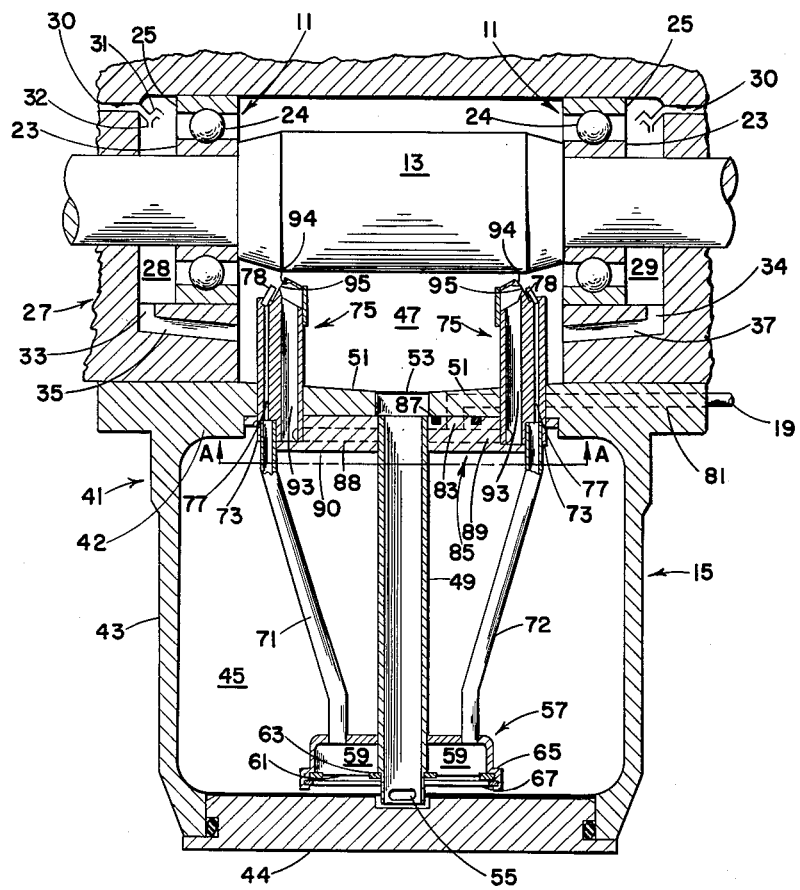
Figures 2, 3:
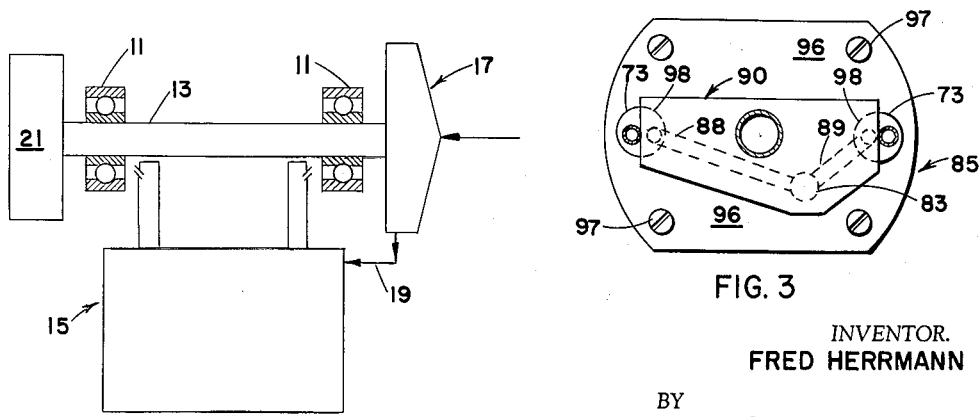

The realization of the above objects, along with the features and advantages of the invention, will be apparent from the following description and the accompanying drawings in which:

Fig. 1 is a partially cross-sectioned view of the mist applicator and the bearing structure and shows structure for forming the mist adjacent the bearings and directly applying it to the inner races. Fig. 2 is a schematic showing of the mist applicator, an air turbine drive and means for supplying air to the applicator and Fig. 3 is a view of the bottom of the support plate of the removable sprayer taken along the line A—A of Fig. 1 and shows the air supply passages.

In Figs. 1 and 2, it is apparent that bearings 11 around shaft 13 receive lubrication from means extending into the space between the lower parts of the bearings. The tube-like parts of the air-oil mist applicator 15 for the bearings 11 which rotatably support shaft 13 projects upwardly adjacent each inner side of the two bearings 11. The pressure air is supplied to the applicator 15 from the outlet of a high speed air turbine 17 (mounted on shaft 13) through conduit 19. Internal passages in the housing could provide this air supply from back of the turbine wheel. The turbine shaft 13 is drivingly connected to an accessory 21 such as a compressor or generator. Referring to Fig. 1, bearings 11 are conventionally comprised of inner race 23, rolling elements or balls 24 and outer race 25. Housing 27 supports and surrounds the bearings 11 and provides annular spaces 28 and 29 at each outer side of the bearings. A small opening or breather passage 30 having an inwardly projecting double-bent tube 31 with an oil drain 32 is located at each top part of annular chambers 28 and 29. This schematic showing of a breather and separator provides baffle means for separating oil from air and permitting the escape of air. A single baffle means can be used and can be connected to the inlet of a compressor mounted on shaft 13. The oil drains from the bottom of chambers 28 and 29 through vertical passages 33 and 34 and inwardly inclined and extending passages 35 and 37 in the housing 27.

Below the bearings, an inverted cup-like structure 41 having a horizontal wall 42 and an annular vertical side wall 43 together with a removable bottom wall or cover 44 form an oil chamber or sump 45. Cover 44 is attached to wall 43 by screws (not shown). The cup structure 41 can be an integral part of housing 27 or attached to the bottom thereof (as suggested Fig. 1) by suitable means (not shown). Housing 27 and wall 42 provide a central annular chamber 47 between the inner sides of bearings 11 and around the shaft 13. Within the oil sump 45, a central tube or standpipe 49 is provided for the return of oil from the inwardly inclined top surface 51 of horizontal wall 42 which has a central opening 53 aligned with the top of oil return tube 49. The returned oil is discharged from standpipe 49 through hole 55 in the bottom thereof.

In the bottom of the oil sump, an inverted cup 57 is brazed to the bottom part of tube 49 so the bottom edge is above the top of the hole 55 and, when inverted forms an oil reservoir chamber 59. The bottom-facing opening of cup 57 has a filter screen 61 for filtering oil. Screen 61 has a central opening in its support ring 63 for the tube 49 and is retained in cup ledge 65 by a snap ring 67. The top horizontal wall of the cup 57 has two capillary tubes or oil risers 71 and 72 attached thereto which extend up into an outer bottom half-segment 73 of two cylindrical rod-like sprayers or nozzle assemblies 75. (See Fig. 3.) Sprayers 75 extend through end openings in cross wall 42 into chamber 47. Each upright sprayer 75 has a capillary passage 77 connected to the outlet of risers 71 and 72 and a capillary nozzle tube 78 connected to the outlet of passage 77. Nozzle tube 78 is inclined inwardly toward the means for providing an air stream which will be described. The oil standpipe 49 serves as an oil trap and the chamber of cup 59 serves as an oil reservoir if the unit is inverted as occurs during inverted flight of an aircraft. The size of the oil passages provide metering but metering of oil flow could be accomplished by means of adjustable orifices in the oil lines.

From Figs. 1 and 3 it can be seen that the pressure air supply for aspirating oil from nozzle tube 78 is provided by horizontal passage 81 which connects with pipe 19 extending from outlet of the turbine. Passage 81 in cross wall 42 connects with a vertical passage 83 in support plate 85. An O-ring 87 seals the joint of plate 85 and wall 42 at vertical passage 83. Horizontal passages 88 and 89 in the depending segment 90 of plate 85 connect with vertical air passages 93 in each inner half-segment of the circular rod-like sprayers 75. Passages 88 and 89 act as a pressure-equalizing chamber. The top of each sprayer has an inclined face 94 having a centered nozzle 95 directed toward the exposed lower axial-extending face of inner race 23 of the bearings whereby means for directing an air-oil mist to the outer surface of the inner race is provided since the air stream will aspirate or pick up oil from the outlet of capillary nozzle tube 78. The support plate 85 has a thin peripheral part 96 (outwardly of the thicker center segment or part 90) which has four holes for attaching plate 85 to wall 42 by screws 97. With reference to Fig. 3 it is to be noted that the lower half of the openings 98 for the sprayers 75 is in the thick depending part 90 of plate 85. It is apparent that the sprayer assembly is easily mounted through the openings in horizontal wall 42 when cover 44 is removed and that a compact mist applicator which does not require external oil lines is provided.

The operation of the lubricating system of the present invention is believed apparent from the foregoing description and the drawing. Thus, when air is discharged from nozzle 95, a small pressure differential is created due to the velocity of the air stream which envelops the upper end of the oil nozzle 78. This pressure differential cause oil to be pushed up the risers 71 and 72 to nozzle 78 where the oil is misted as it enters the air stream. The air-oil mist impinges on the inner bearing race 23 giving maximum heat transfer and lubrication. Oil is metered due to the size of the capillary elements. Air is vented and oil is separated by 30, 31. The oil returns by gravity flow paths to sump 45 so that external oil feed lines are not required. Since air is tapped from the turbine outlet by means of conduit 19, lubrication is always provided when needed without reliance on an external air source. During inverted flight, most of the oil is trapped in the sump by standpipe 49 and reserve oil is supplied by reservoir 59. It is to be noted that the oil mist is formed adjacent the bearings and hence the oil remains divided when impinged on the outer surface of the inner bearing for effective lubricating and cooling. The described lubrication system has proved effective for pressures from 2 to 20 p.s.i., speeds up to 60,000 r.p.m. and temperatures up to 400° F. It is apparent tht the unit is easily assembled and removed.

It is to be understood that persons skilled in the art can make changes in the disclosed embodiment of the invention without departing from the invention set forth in the appended claims.

What is claimed is:

1. A high speed machine comprised of a shaft and spaced bearings rotatably supporting said shaft, housing means supporting said bearings and forming with said shaft an annular chamber between said bearings, two oil mist sprayers extending radially into said annular chamber to adjacent the inner side of each of said bearings, each of said sprayers having an oil passage and being arranged for air to aspirate oil from the respective oil passage and to form oil mist adjacent the inner side of the respective bearings, oil supply means adjacent said annular chamber forming an oil sump and connecting the sump to said oil passages in said sprayers, means for separating the mist and returning oil from the outer sides of each of said bearings by gravity to said oil sump, and each of said sprayers being arranged to discharge oil mist respectively onto the outer surface of each of the inner races of said bearings by being an air nozzle directed to each of said surfaces.

2. In a high-speed machine having a shaft rotatably mounted in a bearing, said bearing having an inner race the improvement comprising housing means supporting said bearing and forming with said shaft a first annular chamber and a second annular chamber at opposite sides of said bearing, mist lubricating means having a sump and a sprayer, said sprayer projecting radially into said second annular chamber to a location adjacent said inner bearing and being constructed and arranged to form air-oil mist adjacent said inner bearing race and to spray said air-oil mist onto the outer surface of said inner bearing, separation means connected to said first annular chamber and arranged to separate oil from air and to return the oil to said first annular chamber, and said housing having gravity-return flow paths arranged to return oil from said first annular chamber through said second annular chamber to said sump.

3. The combination comprised of a rotatable shaft mounted in spaced bearings, said bearings having an inner race and an outer race, housing means supporting said bearings and forming with said shaft an annular chamber between said bearings, said housing means having a longitudinally extending bottom wall forming the bottom of said annular chamber, said bottom wall having two end openings therethrough adjacent said bearings and a central opening at the center thereof to said annular chamber, wall means depending from said bottom wall and forming an oil sump, a support plate having an oil return standpipe fitted in a central opening therein, said support plate being attached to said bottom wall so that an end of said standpipe mates with the central opening in said bottom wall and said standpipe depends into said oil sump to the bottom thereof, said support plate having two rod-like sprayers attached thereto and extending through said end openings in said bottom wall to adjacent said bearings, each of said rod-like sprayers having a small oil passage and an air passage extending lengthwise therethrough, said standpipe having an opening in the bottom thereof and an inverted screened oil reserve cup attached to the lower part thereof, two oil risers extending from the cross wall of said cup to the bottom ends of said oil passages of said sprayers, said bottom wall and said support plate having connecting passages arranged for air to move inwardly to the central part of said support plate and then outwardly to the bottom ends of the air passages in said sprayers, each of said sprayers having an air nozzle constructed to discharge air on the outer surface of the inner bearing race and further having an oil nozzle tube connected to the top of said oil passage and terminating adjacent said nozzle; whereby oil mist is formed adjacent said bearings and directly applied to the inner bearing races.

4. The combination according to claim 3 and further characterized by said wall means having a removable cover constructed so that the structure within said oil sump can be inserted and means arranged to separate oil from air and to return separated oil by gravity to said standpipe.

5. An air turbine device comprised of a turbine having an outlet, a shaft connected to said turbine, spaced bearings rotatably supporting said shaft, housing means supporting said bearings and forming with said shaft an annular chamber between said bearings, two oil mist sprayers extending into said annular chamber to adjacent each of said bearings, each of said sprayers having an oil passage and being arranged for air to aspirate oil from said respective oil passage and to form oil mist, oil supply means adjacent said annular chamber forming an oil sump and connecting the sump to said oil passages in said sprayers, means including a passage in said housing means for supplying air from the outlet of said turbine to said sprayers, each of said sprayers being arranged to discharge oil mist respectively onto the outer surface of each of the inner races of said bearings, said oil supply means including a stand pipe extending from said annular chamber to adjacent the bottom of said sump and having an inverted cup arranged to provide an oil reserve when the air turbine device is inverted.

6. An air turbine device comprised of a turbine having an outlet, a shaft connected to said turbine, spaced bearings rotatably supporting said shaft, housing means supporting said bearings and forming with said shaft an annular chamber between said bearings, two oil mist sprayers extending radially into said annular chamber to adjacent the inner side of each of said bearings, each of said sprayers having an oil passage and being arranged for air to aspirate oil from the respective oil passage and to form oil mist adjacent the inner side of the respective bearings, oil supply means adjacent said annular chamber forming an oil sump and connecting the sump to said oil passages in said sprayers, means for receiving oil mist from the outer side of each of said bearings and for separating the oil from the air, said last mentioned means being arranged to vent the air and to return the oil to said sump, and each of said sprayers being arranged to discharge oil mist respectively onto the outer surface of each of the inner races of said bearings by having an air nozzle directed to each of said surfaces.

References Cited in the file of this patent

UNITED STATES PATENTS

| 1,180,879 | Pyle | Apr. 25, 1916 |
|---|---|---|
| 1,808,792 | Schellens | June 9, 1931 |
| 2,702,093 | Sherrill | Feb. 15, 1955 |